(12) United States Patent
Lee et al.

(10) Patent No.: US 8,427,982 B2
(45) Date of Patent: Apr. 23, 2013

(54) METHOD AND CIRCUIT FOR CONTROLLING RECEPTION PATH OF MULTI-STANDBY TERMINAL

(75) Inventors: Yeon Joo Lee, Seongnam-si (KR); Jae Suk Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 706 days.

(21) Appl. No.: 12/357,811

(22) Filed: Jan. 22, 2009

(65) Prior Publication Data

US 2009/0190563 A1 Jul. 30, 2009

(30) Foreign Application Priority Data

Jan. 29, 2008 (KR) .................. 10-2008-0009076

(51) Int. Cl.
*H04B 1/44* (2006.01)
(52) U.S. Cl.
USPC .......................................... 370/282; 455/78

(58) Field of Classification Search .................. None
See application file for complete search history.

(56) References Cited

U.S. PATENT DOCUMENTS

| | | | |
|---|---|---|---|
| 6,731,953 B1 * | 5/2004 | McGowan et al. | 455/561 |
| 7,515,929 B2 * | 4/2009 | Ramachandran et al. | 455/550.1 |
| 7,835,712 B1 * | 11/2010 | Shi et al. | 455/168.1 |

* cited by examiner

*Primary Examiner* — Kwang B Yao
*Assistant Examiner* — Alex Skripnikov
(74) *Attorney, Agent, or Firm* — Jefferson IP Law, LLP

(57) ABSTRACT

A method and a circuit for controlling a reception path of a multi-standby terminal are provided. If a first communication module is in a transmission state, all filters disposed in a reception path of a second communication module are activated. If the first communication module is not in a transmission state, fewer than all of the filters disposed in the reception path of the second communication module are activated. A plurality of filters disposed in the reception path of the second communication module are activated partially or fully according to the transmission state of the first communication module.

14 Claims, 3 Drawing Sheets

METHOD AND CIRCUIT FOR CONTROLLING RECEPTION PATH OF MULTI-STANDBY TERMINAL

PRIORITY

This application claims the benefit under 35 U.S.C. §119(a) of a Korean patent application filed in the Korean Intellectual Property Office on Jan. 29, 2008 and assigned Serial No. 10-2008-0009076, the entire disclosure of which is hereby incorporated by reference.

BACKGROUND OF THE INVENTION

1. Field of the Invention

The present invention relates to a method and a circuit for controlling a mobile terminal. More particularly, the present invention relates to a method and a circuit for controlling a reception path of a multi-standby terminal.

2. Description of the Related Art

With the rapid development in mobile terminal technology, mobile terminals providing various functions, such as a voice and message communication function, a video communication function, an electronic organizer function, and an internet function, have become popular. Furthermore, multi-standby terminals that can simultaneously communicate with two or more wireless communication networks are being developed. Such a multi-standby terminal can simultaneously communicate not only between different wireless communication networks (for example, CDMA-GSM) but also within two identical wireless communication networks (for example, GSM-GSM).

Generally in a mobile communication terminal, a filter may be installed between an antenna and a Radio Frequency (RF) receiver to maintain reception sensitivity by attenuating a transmission power to reduce its influence on a reception path.

However, in a multi-standby terminal having two or more communication modules, if a first communication module is in a transmission state and a second communication module is in a reception state, a single filter cannot efficiently attenuate a transmission power that is influencing a reception path. That is, the reception sensitivity of the second communication module may be reduced because transmission power of the first communication module influences a reception path of the second communication module, and thereby electrically saturates a low-noise amplifier or generates oscillation. To address this problem, a plurality of filters may be installed in series in the second communication module. Although installation of the plurality of filters in series may help attenuation of the transmission power, a loss of a reception signal is induced due to the filters. This may lead to reduction of the reception sensitivity of the second communication module when the first communication module is not in a transmission state. Therefore, development of a circuit for controlling a reception path of a multi-standby terminal is required such that the reception path of the second communication module can be controlled according to the transmission state of the first communication module.

SUMMARY OF THE INVENTION

An aspect of the present invention is to address at least the above-mentioned problems and/or disadvantages and to provide at least the advantages described below. Accordingly, an aspect of the present invention is to provide a method and a circuit for controlling a reception path of a multi-standby terminal that activate, if a first communication module is in a transmission state, a plurality of filters to attenuate a transmission power of the first communication module to reduce its influence on a reception path of a second communication module, and activate, if the first communication module is not in a transmission state, a portion of the plurality of filters to prevent a loss of a reception signal due to the filters.

In accordance with an aspect of the present invention, a method for controlling a reception path of a multi-standby terminal having a first communication module and a second communication module is provided. The method includes determining whether the first communication module is in a transmission state, and activating at least one of a plurality of filters disposed in a reception path of the second communication module according to the transmission state of the first communication module.

In accordance with another aspect of the present invention, a circuit for controlling a reception path of a multi-standby terminal having a first communication module and a second communication module is provided. The circuit includes a plurality of filters disposed in a reception path in the second communication module, and a control unit for activating at least one of the plurality of filters disposed in a reception path of the second communication module according to a transmission state of the first communication module.

According to exemplary embodiments of the present invention, reception sensitivity of a second communication module in a multi-standby terminal can be stabilized by activating a plurality of filters disposed in a reception path of the second communication module partially or fully according to a transmission state of a first communication module in the multi-standby terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will become more apparent from the following description taken in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

Figure 1:
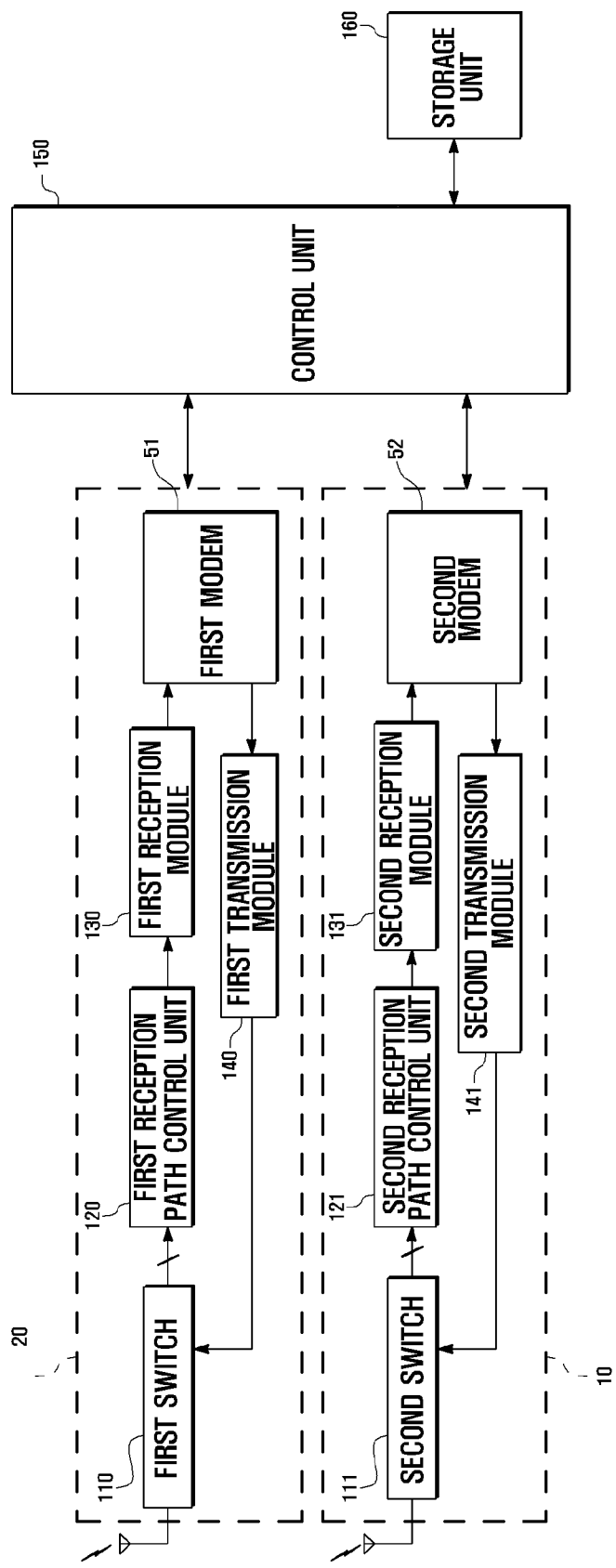
FIG. 1 is a block diagram showing a configuration of a multi-standby terminal according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

A dual-standby terminal communicating in two Global System for Mobile communication (GSM)—GSM wireless communication networks is described as an example of a multi-standby terminal according to the present invention. However, the present invention is not limited thereto. The multi-standby terminal according to the present invention may be a terminal including at least two communication modules using an identical frequency band, and may be used in various wireless communication networks, such as Code Division Multiple Access (CDMA), Global System for Mobile communication (GSM), General Packet Radio Service (GPRS), Enhanced Data GSM Environment (EDGE), Universal Mobile Telecommunications System (UMTS), and Wideband Code Division Multiple Access (WCDMA) networks.

In an exemplary embodiment, a multi-standby terminal includes a first communication module, a second communication module and a control unit for activating a plurality of filters disposed in a reception path of the second communication module partially or fully according to a transmission state of the first communication module. At least one of the first communication module and the second communication module may include a transmission/reception toggle switch for controlling a transmission path and a reception path, a reception path control unit for controlling a reception path, a reception module for filtering and low-noise amplifying a reception signal and down-converting the frequency of the reception signal, and a transmission module for up-converting the frequency of a transmission signal and amplifying the transmission signal.

The control unit may activate a plurality of filters disposed in a reception path of the first communication module partially or fully according to a transmission state of the second communication module.

Hereinafter, a configuration and functions of a multi-standby terminal according to an exemplary embodiment of the present invention are described with reference to the attached drawings.

FIG. 1 is a block diagram showing a configuration of a multi-standby terminal according to an exemplary embodiment of the present invention.

Referring to FIG. 1, the multi-standby terminal 100 includes a first communication module 10, a second communication module 20, a control unit 150 and a storage unit 160. The second communication module 20 includes a first modem 51, a first reception module 130, a first transmission module 140, a first reception path control unit 120 and a first switch 110. The first communication module 10 includes a second modem 52, a second reception module 131, a second transmission module 141, a second reception path control unit 121 and a second switch 111.

The first switch 110 operates as a transmission/reception toggle switch for controlling a reception path and a transmission path of the second communication module 20. The first switch 110 may include an SPxT switch in which a connection terminal may be connected to a plurality of connection terminals selectively according to a control signal. In particular, the first switch 110 controls the transmission path and the reception path according to a control signal of the control unit 150. The structure and control operation of the first switch 110 are described in more detail later with reference to FIG. 2.

The first reception path control unit 120 is connected to the first switch 110. The first reception path control unit 120 controls the reception path of the second communication module 20 according to the transmission state of the second modem 52. An exemplary structure and control operation of the first reception path control unit 120 are described in more detail later with reference to FIG. 2.

The first reception module 130 filters and low-noise amplifies a signal received from the first reception path control unit 120 and down-converts the frequency of the signal for transmission to the first modem 51.

The first transmission module 140 up-converts the frequency of a signal received from the first modem 51 and amplifies the received signal prior to its transmission to the first switch 110.

The second switch 111, second reception path control unit 121, second reception module 131 and second transmission module 141 of the first communication module 10 have functions substantially identical to those of the first switch 110, first reception path control unit 120, first reception module 130 and first transmission module 140, respectively, of the second communication module 20. Therefore, detailed descriptions of these components are omitted.

The control unit 150 controls operations of the multi-standby terminal 100 and controls signal flows between internal units in the multi-standby terminal 100. In particular, the control unit 150 controls the first modem 51 and the second modem 52. The first modem 51 and the second modem 52 demodulate a reception signal to a voice signal, and modulate a voice signal to a transmission signal. Although a GSM modem is described as an example of the first modem 51 and the second modem 52 in this exemplary embodiment, the present invention is not limited thereto. That is, the first modem 51 and the second modem 52 may be modems of different types.

The control unit 150 identifies a transmission state of either the first modem 51 or of the second modem 52 and controls a reception path of either the first communication module 10 or the second communication module 20 according to the identified transmission state. In more detail, when the first modem 51 is in a transmission state, the reception path of the first communication module 10 is controlled by controlling the second switch 111 and the second reception path control unit 121, and when the second modem 52 is in a transmission state, the reception path of the second communication module 20 is controlled by controlling the first switch 110 and the first reception path control unit 120.

The storage unit 160 stores programs for an operating system, for optional functions of the multi-standby terminal 100 such as a sound play function, image display function and movie play function, and for a broadcast signal reception function. The storage unit 160 also stores user data.

Hereinafter, configurations of each component of the multi-standby terminal 100 according to an exemplary embodiment of the present invention are described in more detail.

Figure 2:
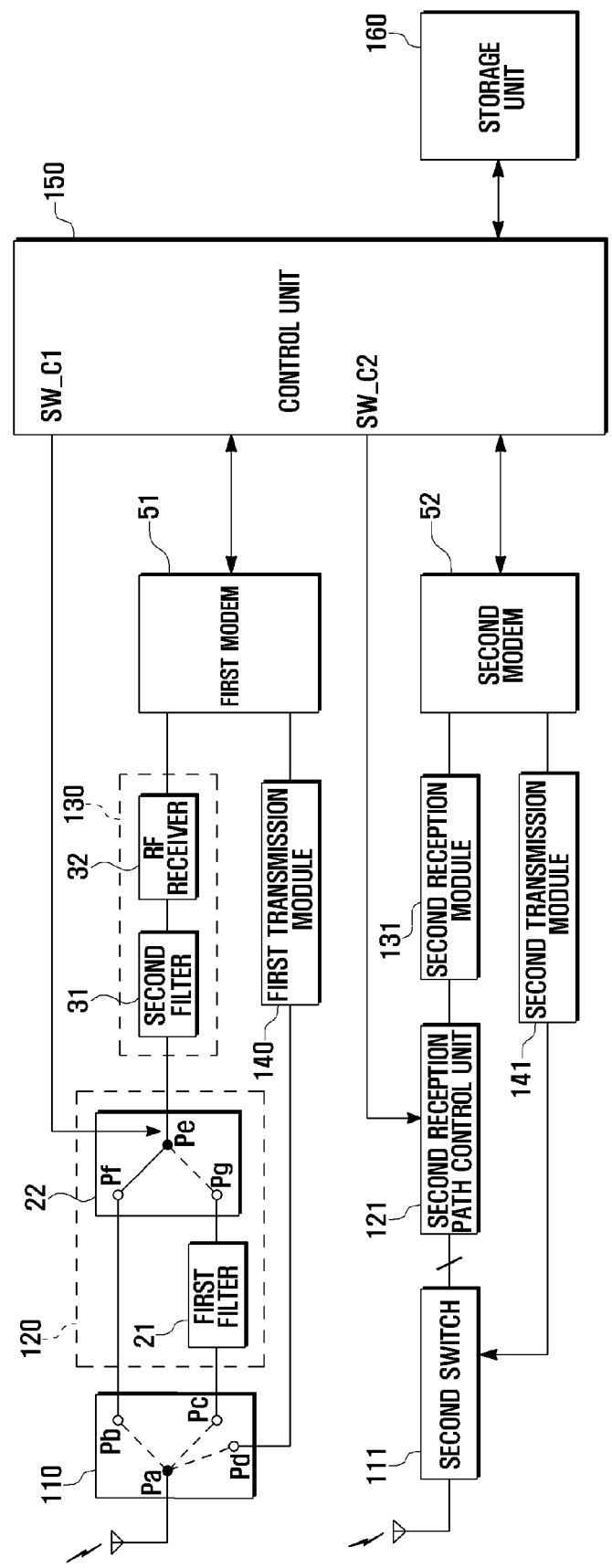
FIG. 2 is a block diagram showing an exemplary configuration of the multi-standby terminal of FIG. 1.

FIG. 2 is a block diagram showing a configuration of the multi-standby terminal 100 of FIG. 1, in which the first switch 110, first reception path control unit 120, and first reception module 130 of the multi-standby terminal 100 are illustrated in more detail. For convenience of explanation, an example is described in which two filters are activated in a reception path of either a first communication module or a second communication module when the second communication module or the first communication module, respectively, is in a transmission state. However, it is to be understood that the present invention is not limited thereto. That is, a plurality of filters in a reception path of either a first or second communication module may be activated when the second communication module or the first communication module, respectively, is in a transmission state.

Referring to FIGS. 1 and 2, the first reception path control unit 120 of the multi-standby terminal 100 includes a first filter 21 and a third switch 22, and the first reception module 130 includes a second filter 31 and a Radio Frequency (RF) receiver 32. Here, the third switch 22 operates as a path-control switch for controlling connections between the first switch 110, first filter 21 and first reception module 130.

The first switch 110 may include an SPxT switch including an antenna connection terminal Pa connected to an antenna, a first reception connection terminal Pc connected to the first filter 21, a second reception connection terminal Pb connected to the third switch 22 and a transmission connection terminal Pd connected to the first transmission module 140. Although not shown in the drawing, one or more control connection terminals may be further included to control the first switch 110. According to a control signal of the control unit 150, the first switch 110 connects the antenna connection terminal Pa to one of the first reception connection terminal Pc, the second reception connection terminal Pb, and the transmission connection terminal Pd. In more detail, when the first modem 51 is in a transmission state, the first switch 110 connects the first transmission module 140 to the antenna by connecting the antenna connection terminal Pa to the transmission terminal connection Pd. That is, the first switch 110 forms a transmission path in the second communication module 20 such that a signal of the first modem 51 is transmitted through the antenna.

When the first modem 51 is not in a transmission state, for example, when the first modem 51 is in a reception state or in a standby state, the antenna connection terminal Pa can be connected to the first reception connection terminal Pc or to the second reception connection terminal Pb according to the transmission state of the second modem 52. When the second modem 52 is in a transmission state, the antenna connection terminal Pa is connected to the first reception connection terminal Pc, and when the second modem 52 is not in a transmission state, the antenna connection terminal Pa is connected to the second reception connection terminal Pb.

The first filter 21 is disposed between the first reception connection terminal Pc of the first switch 110 and a first input connection terminal Pg of the third switch 22. The first filter 21 may be a Surface Acoustic Wave (SAW) filter. The SAW filter is a communication filter utilizing mechanical vibration of a piezoelectric substrate in which two metal sheets, each having a comb pattern, are positioned across each other in order to form a grid-like pattern. If an electric signal is input through an end of the SAW filter, a surface acoustic wave is generated on the piezoelectric substrate, and the surface acoustic wave is converted to an electric signal at the other end of the SAW filter. Here, if the frequency of the input electric signal is not identical to that of the surface acoustic wave of the piezoelectric substrate, the input electric signal is eliminated. That is, the SAW filter is a Band Pass Filter (BPF) that passes only a signal having a frequency identical to a native frequency of a filter material. Such a SAW filter has characteristics of transmission power attenuation by attenuating transmission power by a certain amount and insertion loss by reducing reception signal output of the SAW filter by a certain amount.

The third switch 22 includes the first input connection terminal Pg connected to the first filter 21, a second input connection terminal Pf connected to the second reception connection terminal Pb of the first switch 110, an output connection terminal Pe connected to the second filter 31 and a control connection terminal for controlling the third switch 22.

The third switch 22 connects the output connection terminal Pe to the first input connection terminal Pg or to the second input connection terminal Pf according to a control signal SW_C1 of the control unit 150. In more detail, when the second modem 52 is in a transmission state, the third switch 22 connects the output connection terminal Pe to the first input connection terminal Pg. When the second modem 52 is not in a transmission state, the third switch 22 connects the output connection terminal Pe to the second input connection terminal Pf. That is, the third switch 22 controls the reception path of the second communication module 20 according to the control signal SW_C1 generated corresponding to the transmission state of the second modem 52.

The second filter 31 has an identical function to that of the first filter 21, and is located between the output connection terminal Pe of the third switch 22 and the RF receiver 32. Therefore, a description of the second filter 31 is omitted.

The RF receiver 32 low-noise amplifies a signal received through the second filter 31 and down-converts the frequency of the received signal for transmission to the first modem 51.

The first transmission module 140 is disposed between the transmission connection terminal Pd of the first switch 110 and the first modem 51. The first transmission module 140 up-converts the frequency of a transmission signal of the first modem 51 and amplifies the transmission signal.

As described above, the control unit 150 controls operations and signal flows between internal units of the multi-standby terminal 100. In particular, the control unit 150 identifies a transmission state of the first modem 51, and controls the reception path of the first communication module 10 according to the transmission state of the first modem 51. Further, the control unit 150 identifies a transmission state of the second modem 52, and controls the reception path of the second communication module 20 according to the transmission state of the second modem 52. In controlling the reception path, each of a plurality of filters included in the reception path may be activated. When the second modem 52 is in a transmission state, the control unit 150 controls the first switch 110 to connect the antenna connection terminal Pa to the first reception connection terminal Pc, and controls the third switch 22 to connect the output connection terminal Pe to the first input connection terminal Pg. That is, a first reception path of the second communication module 20 is formed through the first switch 110 connected to an antenna, the first filter 21 connected to the first reception connection terminal Pc of the first switch 110, the third switch 22 connected to the first filter 21, the second filter 31 connected to the output connection terminal Pe of the third switch 22, and the RF receiver 32 connected to the second filter 31.

When the second modem 52 is not in a transmission state, the control unit 150 controls the first switch 110 to connect the antenna connection terminal Pa to the second reception connection terminal Pb, and controls the third switch 22 to connect the output connection terminal Pe to the second input connection terminal Pf. That is, a second reception path of the second communication module 20 is formed through the first switch 110 connected to an antenna, the third switch 22 connected to the second reception connection terminal Pb of the first switch 110, the second filter 31 connected to the output connection terminal Pe of the third switch 22, and the RF receiver 32 connected to the second filter 31.

The above description describes an exemplary process of forming a reception path of the second communication module 20 according to the transmission state of the second modem 52. A process of forming a reception path of the first communication module 10 according to the transmission state of the first modem 51 is similar to the above description and therefore description thereof is omitted.

Hereinafter, reception capacities of a terminal according to an exemplary embodiment of the present invention and of a conventional terminal are described with reference to comparison test results illustrated in Table 1.

The comparison test was performed by forming a communication channel between simulation models and measuring reception capacities of each terminal in a non-reflecting chamber. To obtain an accurate test result, the test was repeated for various terminals in various channels. The terminals used in this test include a SAW filter having characteristics of a transmission power attenuation of −20 dB and an insertion loss of −2 dB.

The 'reception capacity' indicates a minimum intensity of a reception signal at which a communication module can demodulate a received signal. For example, a terminal having a reception capacity of −90 dB can demodulate a signal having signal intensity equal to or greater than −90 dB. If the signal intensity is less than or equal to −91 dB, the terminal cannot demodulate a signal or errors may be included in the demodulated signal. The reception capacity is indicated in a unit of dB, which is omitted in Table 1.

tional terminal show an identical reception capacity of −88 dB in a single communication mode. This indicates that a loss of a reception signal according to an insertion loss of a path-control switch does not affect the maximum radio reception capacity of the terminal in a linear form. However, in a dual communication mode using two communication modules simultaneously, the conventional terminal shows a reception capacity of −65 dB, whereas the terminal according to an exemplary embodiment of the present invention shows a reception capacity of −77 dB. That is, the reception capacity of the terminal according to an exemplary embodiment of the present invention is improved by approximately 11 dB compared to that of the conventional terminal.

In the above test environment, the SAW filter and the test data of Table 1 are illustrated as an example. However, the present invention is not limited thereto. The test data of Table 1 may change according to various test environments.

Hereinafter, a method for configuring a reception path in a multi-standby terminal 100 according to an exemplary embodiment of the present invention is described.

Figure 3:
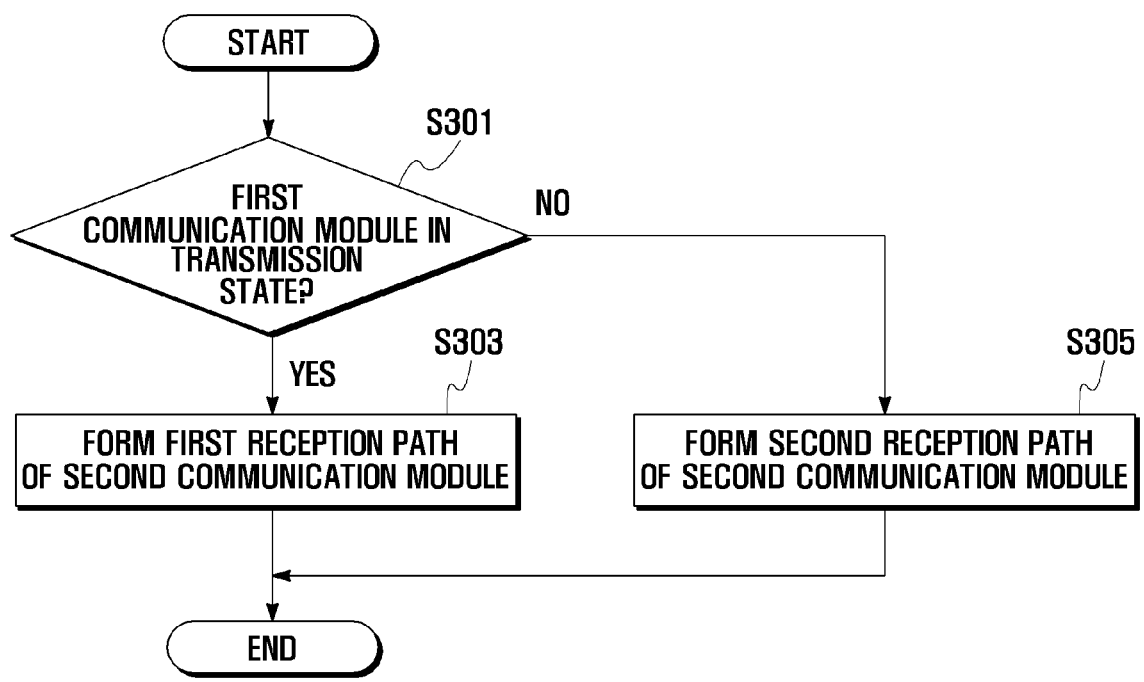
FIG. 3 is a flowchart showing a method of controlling a reception path of a multi-standby terminal according to an exemplary embodiment of the present invention.

FIG. 3 is a flowchart showing a method of controlling a reception path of a multi-standby terminal according to an exemplary embodiment of the present invention.

For convenience in explanation, a method for controlling a reception path of the second communication module 20 is described according to the transmission state of the second modem 52. However, the present invention is not limited thereto. That is, a reception path of the first communication module 10 may also be controlled according to the transmission state of the first modem 51.

Referring to FIGS. 2 and 3, the control unit 150 determines whether the first communication module 10 is in a transmission state in step S301. If the first communication module 10 is in a transmission state, the control unit 150 controls the first switch 110 to connect the antenna connection terminal Pa to the first reception connection terminal Pc, and controls the third switch 22 to connect the output connection terminal Pe to the first input connection terminal Pg in step S303. Accordingly, a first reception path of the second communication module 20 is formed through the first switch 110 connected to

TABLE 1

| | Conventional terminal | | | | | | Terminal according to an exemplary embodiment of the present invention | | | | | |
|---|---|---|---|---|---|---|---|---|---|---|---|---|
| | #1 | | | #2 | | | #1 | | | #2 | | |
| Channel | 975 | 62 | 124 | 975 | 62 | 124 | 975 | 62 | 124 | 975 | 62 | 124 |
| Single communication | −89 | −88 | −89 | −89 | −89 | −90 | −88 | −88 | −89 | −90 | −89 | −90 |
| Dual communication | −66 | −65 | −65 | −67 | −68 | −69 | −76 | −77 | −78 | −78 | −78 | −78 |
| Improvement | | | | | | Improved by 11 dB approx. | | | | | | |

Table 1 shows reception capacity data of terminals according to an exemplary embodiment of the present invention and conventional terminals in a single communication mode and a dual communication mode.

The reception capacity of the conventional terminal and of the terminal according to an exemplary embodiment of the present invention may slightly deviate according to the channels and individual terminals. For convenience of explanation, the following comparison is made only between the reception capacities of terminal #1 according to an exemplary embodiment of the present invention and the conventional terminal #1 under the condition of channel 62.

Referring to Table 1, the terminal according to an exemplary embodiment of the present invention and the convenan antenna, the first filter 21 connected to the first reception connection terminal Pc of the first switch 110, the third switch 22 connected to the first filter 21, the second filter 31 connected to the output connection terminal Pe of the third switch 22, and the RF receiver 32 connected to the second filter 31.

If the first communication module 10 is not in a transmission state at step S301, the control unit 150 controls the first switch 110 to connect the antenna connection terminal Pa to the second reception connection terminal Pb, and controls the third switch 22 to connect the output connection terminal Pe to the second input connection terminal Pf in step S305. Accordingly, a second reception path of the second communication module 20 is formed through the first switch 110 connected to an antenna, the third switch 22 connected to the second reception connection terminal Pb of the first switch 110, the second filter 31 connected to the output connection terminal Pe of the third switch 22, and the RF receiver 32 connected to the second filter 31.

The above configuration of the multi-standby terminal 100 is illustrated as an example for convenience in explanation, and the present invention is not limited thereto. That is, the multi-standby terminal 100 may be formed in various configurations providing a dual-standby communication function. For example, a first communication chip set (such as a Mobile Station Modem (MSM) chip set) supporting CDMA/GSM communication, and a second communication chip set (such as a Sysol chip set) supporting GSM communication may be used, and one of the first communication chip set and second communication chip set may operate as a main chip set to control the other communication chip set.

While the present invention has been shown and described in detail with reference to certain exemplary embodiments thereof, it should be understood by those skilled in the art that various changes in form and details may be made therein without departing from the spirit and scope of the invention as defined by the appended claims and their equivalents.

What is claimed is:

1. A method for controlling a reception path of a multi-standby terminal having a first communication module and a second communication module, the method comprising:
    determining whether the first communication module is in a transmission state; and
    activating at least one of a plurality of filters disposed in a reception path of the second communication module according to the transmission state of the first communication module,
    wherein the activating of at least one of the plurality of filters comprises activating, if the first communication module is in the transmission state, all of the plurality of filters disposed in the reception path of the second communication module, and
    wherein the activating of all of the filters disposed in the reception path of the second communication module comprises switching a first switch to connect an antenna to a first filter, wherein the first filter is coupled to a third switch, and wherein the first communication module comprises a second switch.

2. The method of claim 1, wherein the first communication module and the second communication module use a substantially identical frequency band.

3. The method of claim 1, wherein the first communication module and the second communication module comprise GSM communication modules.

4. The method of claim 1, wherein the activating of all of the filters disposed in the reception path of the second communication module further comprises switching the third switch to connect the first filter to a second filter.

5. The method of claim 1, wherein the activating of at least one of the plurality of filters comprises activating, if the first communication module is not in the transmission state, fewer than all of the plurality of filters disposed in the reception path of the second communication module.

6. The method of claim 5, wherein the activating of fewer than all of the plurality of filters disposed in the reception path of the second communication module comprises switching the first switch to connect the antenna to the third switch, and
    wherein the first communication module comprises the second switch.

7. The method of claim 6, wherein the activating of fewer than all of the plurality of filters disposed in the reception path of the second communication module further comprises switching the third switch to connect the first switch to a second filter without connecting the first switch to the first filter.

8. A circuit for controlling a reception path of a multi-standby terminal having a first communication module and a second communication module, the circuit comprising:
    a plurality of filters disposed in a reception path in the second communication module; and
    a control unit for activating at least one of the plurality of filters disposed in the reception path of the second communication module according to a transmission state of the first communication module,
    wherein at least one of the first communication module and the second communication module comprises:
    a transmission/reception toggle switch for controlling a reception path of the at least one of the first communication module and the second communication module and a transmission path of the at least one of the first communication module and the second communication module;
    a reception path control unit for controlling the reception path of the at least one of the first communication module and the second communication module according to the transmission state of the other one of the at least one of the first communication module and the second communication module;
    a reception module for filtering and low-noise amplifying a signal received from the reception path control unit, and for down-converting a frequency of the signal;
    a modem for demodulating a signal received from the reception module to a voice signal and for modulating a voice signal to a transmission signal; and
    a transmission module for up-converting a frequency of a signal received from the modem and amplifying the signal received from the modem.

9. The circuit of claim 8, wherein the first communication module and the second communication module use an identical frequency band.

10. The circuit of claim 8, wherein the first communication module and the second communication module comprise GSM communication modules.

11. The circuit of claim 8, wherein the reception path control unit comprises:
    a first filter having characteristics of transmission power attenuation for attenuating a transmission power by a certain amount and insertion loss for reducing a reception signal by a certain amount, and
    a path-control switch for controlling connection of the transmission/reception toggle switch to the first filter and the reception module; and
    wherein the reception module comprises:
    a second filter having characteristics of transmission power attenuation for reducing a transmission power of a signal received through the path-control switch by a certain amount and insertion loss for reducing a reception signal by a certain amount, and
    a radio frequency receiver for low-noise amplifying a signal received through the second filter and down-converting a frequency of the signal received through the second filter.

12. The circuit of claim 11, wherein the second communication module forms, if the first communication module is in the transmission state, a first reception path through the transmission/reception toggle switch connected to an antenna, the first filter connected to a first reception connection terminal of the transmission/reception toggle switch, the path-control switch connected to the first filter, the second filter connected to an output connection terminal of the path-control switch, and the radio frequency receiver connected to the second filter.

13. The circuit of claim 11, wherein the reception path of the at least one of the first communication module and the second communication module comprises a first reception path and a second reception path,
   wherein the transmission/reception toggle switch comprises a first reception connection terminal and a second reception connection terminal, and
   wherein the second communication module forms, if the first communication module is not in the transmission state, the second reception path through the transmission/reception toggle switch connected to an antenna, the path-control switch connected to the second reception connection terminal of the transmission/reception toggle switch, the second filter connected to an output connection terminal of the path-control switch, and the radio frequency receiver connected to the second filter.

14. A method for controlling a multi-standby terminal having a first communication module and a second communication module, the method comprising:
   determining whether the first communication module is in a transmission state;
   determining whether the second communication module is in a transmission state;
   controlling a first switch to connect an antenna to all of a plurality of filters disposed in a reception path of the second communication module if the first communication module is in the transmission state; and
   controlling the first switch to connect the antenna to a transmission module of the second communication module if the second communication module is in the transmission state,
   wherein the controlling the first switch to connect the antenna to all of the filters disposed in the reception path of the second communication module comprises switching the first switch to connect the antenna to a first filter, wherein the first filter is coupled to a third switch, and wherein the first communication module comprises a second switch.

* * * * *